United States Patent [19]

Sasaki et al.

[11] Patent Number: 5,279,763
[45] Date of Patent: Jan. 18, 1994

[54] NEMATIC LIQUID-CRYSTAL COMPOSITION FOR ACTIVE MATRIX APPLICATION

[75] Inventors: Kei Sasaki, Tenri; Masako Okada, Ikoma; Shuichi Kohzaki, Nara; Fumiaki Funada, Yamatokooriyama; Hiroshi Numata, Yokohama; Shohei Naemura, Yokohama; Bernhard Rieger, Yokohama, all of Japan; Herbert Plach, Darmstadt, Fed. Rep. of Germany

[73] Assignees: Merck Patent Gesellschaft mit beschrankter Haftung, Darmstadt, Fed. Rep. of Germany; Sharp Corporation, Osaka, Japan

[21] Appl. No.: 755,226

[22] Filed: Sep. 5, 1991

[30] Foreign Application Priority Data

Sep. 5, 1990 [EP] European Pat. Off. ......... 90117072.0

[51] Int. Cl.$^5$ .................. C09K 19/30; C09K 19/12; C09K 19/52; G02F 1/13

[52] U.S. Cl. ..................... 252/299.63; 252/299.01; 252/299.66; 359/106; 359/103

[58] Field of Search ........... 252/299.01, 299.6, 299.61, 252/299.62, 299.63, 299.64, 299.65, 299.66, 299.67; 359/103, 106

[56] References Cited

U.S. PATENT DOCUMENTS

| | | | |
|---|---|---|---|
| 5,064,567 | 11/1991 | Funada et al. | 252/299.61 |
| 5,122,295 | 6/1992 | Weber et al. | 252/299.01 |
| 5,167,860 | 12/1992 | Sawada et al. | 252/299.63 |
| 5,171,469 | 12/1992 | Hittich et al. | 252/299.01 |
| 5,174,920 | 12/1992 | Iijima | 252/299.01 |

Primary Examiner—Richard D. Lovering
Assistant Examiner—Shean C. Wu
Attorney, Agent, or Firm—Millen, White, Zelano, & Branigan

[57] ABSTRACT

A nematic liquid-crystal composition for active matrix displays has a high voltage holding ratio and extremely good low temperature stability.

8 Claims, No Drawings

NEMATIC LIQUID-CRYSTAL COMPOSITION FOR ACTIVE MATRIX APPLICATION

BACKGROUND OF THE INVENTION

The invention relates to a nematic liquid-crystal composition for active matrix application.

Active matrix displays (AMD) are highly favored for commercially interesting displays with a high information content. Such AMDs are used for TV application and also for displays with high information content for automobiles and aeroplanes.

AMDs have non-linear electrical switching elements which are integrated at each picture element. As non-linear driving elements thin film transistors (TFT) [Okubo, U., et al., 1982, SID 82 Digest, pp. 40–41] or diodes (e.g.,: metal insulator metal: MIM) [Niwa, K., et al., 1984, SID 84, Digest, pp. 304–307]can be applied. These non-linear driving elements allow the use of an electro-optical effect with a rather flat electro-optical characteristic if a good viewing angle characteristic can be obtained. So a TN-type LC cell [Schadt, M. and Helfrich, W., 1971, Appl. Phys. Lett., 18, 127] with a twist angle of 90. can be used. To provide the good contrast over a wide viewing angle, operation in the first minimum of transmission [Pohl, L., Eidenschink, R., Pino, F. Del., and Weber, G., 1980, German Pat., DBP 30 22 818, and 1981, U.S. Pat. 4,398,803; Pohl, L. Weber, G., Eidenschink, R., Baur, G., and Fehrenbach, W., 1981, Appl. Phys. Lett., 38, 497; Weber, G., Finkenzeller, U., Geelhaar, T., Plach, H. J., Rieger, B., and Pohl, L., 1988, Int. Symp. on Liq. Cryst., Freiburg, to be published in Liq. Crys.]is required. These AMDs are very well suited for TV applications and consequently are of high commercial interest. For these applications some physical properties of the liquid crystals become more important than for passive TN displays. Some of the decisive properties for the performance of an AMD are resistivity and stability of the liquid crystal [Togashi, S., Sekiguchi, K., Tanabe, H., Yamamoto, E., Sorimachi, K., Kajima, E., Watanabe, H., Shimuzu, H., Proc. Eurodisplay 84, September 1984: A 210-288 Matrix LCD Controlled by Double Stage Diode Rings, p. 144 ff, Paris; Stromer, M., Proc. Eurodisplay 84, September 1984: Design of Thin Film Transistors for Matrix Addressing of Television Liquid Crystal Displays, p. 145 ff, Paris].

In an AMD, the non-linear switching elements are addressed in a multiplex scheme. So they charge the electrodes of a pixel in the limited time they are active. Then they become inactive until they are addressed again in the next cycle. Consequently the change of the voltage on an activated (charged) pixel is a nondesired but a very decisive feature of such a display. The discharge of a pixel is determined by two factors. They are the capacity of the electrodes of the pixel and resistivity of the dielectric material between the electrodes, namely the liquid crystal. The characteristic time constant of the decay of the voltage at a pixel (RC-time) has to be significantly bigger than the time between two addressing cycles ($t_{adr}$). A parameter frequently used to describe the performance of an AMD is the voltage holding ratio HR of a picture element:

$$HR = \frac{V(t_o) + V(t_o + t_{adr})}{2 V(t_o)}$$

As the voltage at a pixel decays exponentially, an increase of the holding ratio necessitates liquid crystal materials with exceptionally high resistivities.

There are several points of importance for the resistivity of the liquid crystal inside a display, e.g., orientation layers, and curing condition of the orientation material. But by no means less important are the electrical properties of the liquid crystal used. Especially the resistivity of the liquid crystal in the display determines the magnitude of the voltage drop at the pixel.

SUMMARY OF THE INVENTION

There is thus still a great need for liquid-crystal compositions having a high resistivity and other suitable material properties for use in AMDs such as abroad nematic mesophase range with an extremely low transition temperature smectic-nematic and no crystallization at low temperatures.

This invention provides a liquid-crystal composition with a very high resistivity which meets also the other demands of AMDs.

It has now been found that a nematic liquid-crystal composition based on terminally and laterally fluorinated compounds, comprising about 15 to 25% by weight of at least three compounds of group 1:

group 1:

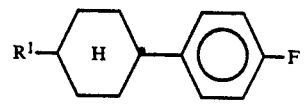

wherein $R^1$ denotes a straight-chain alkyl group of 5 or more carbon atoms, e.g., up to 7 carbon atoms, about 15 to 25% by weight of at least two compounds from group 2:

group 2:

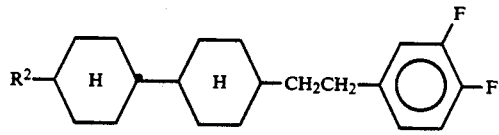

wherein $R^2$ denotes a straight-chain alkyl group of 3 to 5 carbon atoms, about 5 to 15% by weight of at least two compounds from group 3:

group 3:

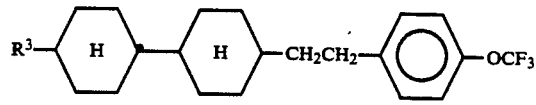

about 20 to 30% by weight of at least four compounds from group 4:

group 4:

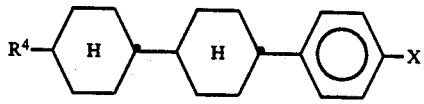

about 5 to 15% by weight of at least three compounds from group 5:

group 5:

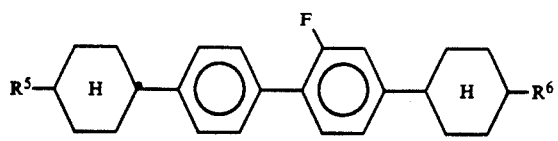

about 5 to 15% by weight of at least two compounds from group 6:

group 6:

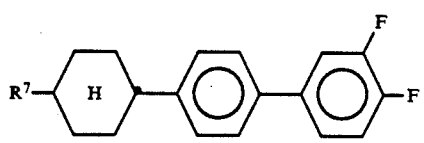

where $R^3$ to $R^7$ each independently denotes a straight-chain alkyl group of 2 to 5 carbon atoms and X is F or $OCF_3$, and about 5 to 15% by weight of two compounds from group 7:

group 7:

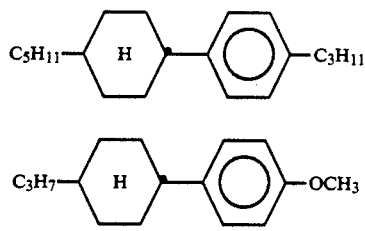

is highly suited for AMD application. Very high RC time values can be obtained in AMDs. These compositions also show a reduced viscosity, allow operation in AMDs in the first minimum of transmission and do not exhibit any crystallization over 1000 hrs at −30° C.

Typically, there are up to four compounds from each of groups 1-6 in each composition. When present, a component of any of the groups 1-7 is usually present in an amount of at least about 1%; however, the lower limit is not critical.

The compounds from groups 1 to 7 are known from the German Patent 26 36 684, the European Patent 0 051 738 and 0 125 653, the International Patent Application WO 89/02884 and U.S. Pat. No. 4,302,352, U.S. Pat. No. 4,710,315 and U.S. Pat. No. 4,419,264 or can be prepared in analogy to known compounds.

Such compositions preferably contain at least three compounds of group 1 wherein $R^1$ is n-pentyl, n-hexyl and n-heptyl. Preferably at least four compounds from group 3 are present.

The preparation of the compositions according to the invention is effected in the conventional manner. In general, the desired amount of the components which is used in the smaller amount is dissolved in the components which constitute the main constituent, preferably at elevated temperature. If this temperature is chosen to be above the clear point of the main constituent, the completeness of the process of dissolving can be observed particularly easily.

However, it is also possible to mix solutions of the components in a suitable organic solvent, for example acetone, chloroform or methanol, and to remove the solvent after thorough mixing, for example by distillation under reduced pressure. It is self-evident that with this method it must be ensured that the solvent does not introduce any contaminants or undesirable dopants.

By means of suitable conventional additives the liquid crystal phases according to the invention can be modified in such a way that they can be used in any hitherto disclosed kind of AMD, according to conventional considerations.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application EP 90 117 072.0, filed Sep. 5, 1990, are hereby incorporated by reference.

In the examples, the melting point and clear point of a liquid crystal substance are given in degrees Celsius.

EXAMPLES

EXAMPLE 1

A liquid-crystal composition consisting of
10% of trans-1-p-fluorophenyl-4-n-pentylcyclohexane,
5% of trans-1-p-fluorophenyl-4-n-hexylcyclohexane,
4% of trans-1-p-fluorophenyl-4-n-heptylcyclohexane,
4% of trans-1-p-n-propylphenyl-4-n-pentylcyclohexane,
4% of trans-1-p-n-methoxyphenyl-4-n-propylcyclohexane,
6% of p-[trans-4-(trans-4-ethylcyclohexyl)-cyclohexyl]-trifluoromethoxybenzene,
7% of p-[trans-4-(trans-4-propylcyclohexyl)-cyclohexyl]-trifluoromethoxybenzene,
6% of p-[trans-4-(trans-4-n-butylcyclohexyl)-cyclohexyl]-trifluoromethoxybenzene,
7% of p-[trans-4-(trans-4-n-pentylcyclohexyl)-cyclohexyl]-trifluoromethoxybenzene,
9% of p-[trans-4-(trans-n-propylcyclohexyl)-cyclohexyl]-2-(3,4-difluorophenyl)-ethane,
9% of p-[trans-4-(trans-n-pentylcyclohexyl)-cyclohexyl]-2-(3,4-difluorophenyl)-ethane,
4% of p-[trans-4-(trans-n-propylcyclohexyl)-cyclohexyl]-2-(4-trifluoromethoxyphenyl)-ethane,
4% of p-[trans-4-(trans-n-pentylcyclohexyl)-cyclohexyl]- 2-(4-trifluoromethoxyphenyl)-ethane,
6% of 4'-(trans-4-n-propylcyclohexyl)-3,4-difluorobiphenyl,
5% of 4'-(trans-4-n-pentylcyclohexyl)-3,4-difluorobiphenyl,
4% of 4,4'-bis-(trans-4-propylcyclohexyl)-2-fluorobiphenyl,
3% of 4,4'-bis-(trans-4-pentylcyclohexyl)-2-fluorobiphenyl and
3% of 4-(trans-4-pentylcyclohexyl)-4'-(trans-4-propylcyclohexyl)-2-fluorophenyl shows a clearing point of 95°, a viscosity at 20° of 16 mPa s and a birefringence Δn of 0.0910. This composition is nematic at −40°, can be stored at −30° over 1000 hrs without crystallization, shows a high resistivity in the order of $10^{13}$ Ω.cm or more and is well suited for AMDs.

EXAMPLE 2

A liquid-crystal composition consisting of
10% of trans-1-p-fluorophenyl-4-n-pentylcyclohexane,
5% of trans-1-p-fluorophenyl-4-n-hexylcyclohexane,
4% of trans-1-p-fluorophenyl-4-n-heptylcyclohexane,
4% of trans-1-p-n-propylphenyl-4-n-pentylcyclohexane,
4% of trans-1-p-n-methoxyphenyl-4-n-propylcyclohexane,
4% of p-[trans-4-(trans-4-ethylcyclohexyl)-cyclohexyl]-trifluoromethoxybenzene,
7% of p-[trans-4-(trans-4-propylcyclohexyl)-cyclohexyl]-trifluoromethoxybenzene,
5% of p-[trans-4-(trans-4-n-butylcyclohexyl)-cyclohexyl]-trifluoromethoxybenzene,
7% of p-[trans-4-(trans-4-n-pentylcyclohexyl)-cyclohexyl]-trifluoromethoxybenzene,
9% of p-[trans-4-(trans-4-n-propylcyclohexyl)-cyclohexyl]-2-(3,4-difluorophenyl)-ethane,
9% of p-[trans-4-(trans-4-n-pentylcyclohexyl)-cyclohexyl]-2-(3,4-difluorophenyl)-ethane,
2% of p-[trans-4-(trans-4-n-propylcyclohexyl)-cyclohexyl]-2-(4-trifluoromethoxyphenyl)-ethane,
3% of p-[trans-4-(trans-4-n-pentylcyclohexyl)-cyclohexyl]-2-(4-trifluoromethoxyphenyl)-ethane,
6% of 4'-(trans-4-n-propylcyclohexyl)-3,4-difluorobiphenyl,
5% of 4'-(trans-4-n-pentylcyclohexyl)-3,4-difluorobiphenyl,
3% of p-[trans-4-(trans-4-n-propylcyclohexyl)-cyclohexyl]-2-(p-fluorophenyl)-ethane,
3% of p-(trans-4-n-pentylcyclohexyl)-cyclohexyl]-2-(p-fluorophenyl)-ethane,
4% of 4,4'-bis-(trans-4-propylcyclohexyl)-2-fluorobiphenyl,
3% of 4,4'-bis-(trans-4-pentylcyclohexyl)-2-fluorobiphenyl, and
3% of 4-(trans-4-pentylcyclohexyl)-4'-(trans-4-propylcyclohexyl)-2-fluorophenyl
shows a clearing point of 96°, and a birefringence Δn of 0.0921. This composition is nematic at −40°, can be stored at −30° over 1000 hrs without crystallization, shows a high resistivity in the order of $10^{13}$ Ω.cm or more and is well suited for AMDs.

EXAMPLE 3

A liquid-crystal composition consisting of
7% of trans-1-p-fluorophenyl-4-n-pentylcyclohexane,
6% of trans-1-p-fluorophenyl-4-n-hexylcyclohexane,
6% of trans-1-p-fluorophenyl-4-n-heptylcyclohexane,
4% of trans-1-p-n-propylphenyl-4-n-pentylcyclohexane,
4% of trans-1-p-n-methoxyphenyl-4-n-propylcyclohexane,
5% of p-[trans-4-(trans-4-ethylcyclohexyl)-cyclohexyl]-trifluoromethoxybenzene,
6% of p-[trans-4-(trans-4-propylcyclohexyl)-cyclohexyl]-trifluoromethoxybenzene,
6% of p-[trans-4-(trans-4-n-butylcyclohexyl)-cyclohexyl]-trifluoromethoxybenzene,
6% of p-[trans-4-(trans-4-n-pentylcyclohexyl)-cyclohexyl]-trifluoromethoxybenzene,
9% of p-[trans-4-(trans-4-n-propylcyclohexyl)-cyclohexyl]-2-(3,4-difluorophenyl)-ethane,
9% of p-[trans-4-(trans-4-n-pentylcyclohexyl)-cyclohexyl]-2-(3,4-difluorophenyl)-ethane,
2% of p-[trans-4-(trans-4-n-propylcyclohexyl)-cyclohexyl]-2-(4-trifluoromethoxyphenyl)-ethane,
3% of p-[trans-4-(trans-4-n-pentylcyclohexyl)-cyclohexyl]-2-(4-trifluoromethoxyphenyl)-ethane,
6% of 4'-(trans-4-n-propylcyclohexyl)-3,4-difluorobiphenyl,
5% of 4'-(trans-4-n-pentylcyclohexyl)-3,4-difluorobiphenyl,
3% of p-[trans-4-(trans-4-n-propylcyclohexyl)-cyclohexyl]-2-(p-fluorophenyl)-ethane,
3% of p-[trans-4-(trans-4-n-pentylcyclohexyl)-cyclohexyl]-2-(p-fluorophenyl)-ethane,
4% of 4,4'-bis-(trans-4-propylcyclohexyl)-2-fluorobiphenyl,
3% of 4,4'-bis-(trans-4-pentylcyclohexyl)-2-fluorobiphenyl, and
3% of 4-(trans-4-pentylcyclohexyl)-4'-(trans-4-propylcyclohexyl)-2-fluorophenyl
shows a clearing point of 96°, and a birefringence Δn of 0.0916. This composition is nematic at −40°, can be stored at −30° over 1000 hrs without crystallization, shows a high resistivity in the order of $10^{13}$ Ω.cm or more and is well suited for AMDs.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nematic liquid-crystal composition based on terminally and laterally fluorinated compounds comprising
about 15 to 25% by weight of at least three compounds from group 1:

group 1:

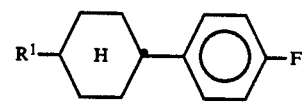

wherein $R^1$ is a straight-chain alkyl group of 5 or more carbon atoms,
about 15 to 25% by weight of at least two compounds from group 2:

group 2:

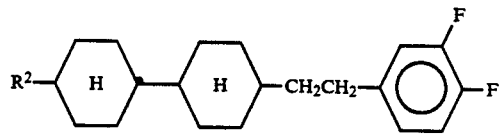

wherein $R^2$ is a straight-chain alkyl group of 3 to 5 carbon atoms, about 5 to 15% by weight of at least two compounds from group 3:

group 3:

R³—⟨H⟩—⟨H⟩—CH₂CH₂—⟨◯⟩—X about 20 to 30% by weight of at least four compounds from group 4:

group 4:

R⁴—⟨H⟩—⟨H⟩—⟨◯⟩—OCF₃ about 5 to 15% by weight of at least three compounds from group 5:

group 5:

R⁵—⟨H⟩—⟨◯⟩—⟨◯(F)⟩—⟨H⟩—R⁶ about 5 to 15% by weight of at least two compounds from group 6:

group 6:

R⁷—⟨H⟩—⟨◯⟩—⟨◯(F)⟩—F where R³ to R⁷ each independently is a straight-chain alkyl group of 2 to 5 carbon atoms and X is F or OCF₃, and about 5 to 15% by weight of two compounds from group 7:

group 7:

C₅H₁₁—⟨H⟩—⟨◯⟩—C₃H₁₁

C₃H₇—⟨H⟩—⟨◯⟩—OCH₃.

2. A composition of claim 1, wherein at least three compounds of group 1 are present wherein R¹ is n-pentyl, n-hexyl and n-heptyl.

3. A composition of claim 1 comprising at least four compounds from group 3.

4. A composition of claim 1 consisting essentially of trans-1-p-fluorophenyl-4-n-pentylcyclohexane, trans-1-p-fluorophenyl-4-n-hexylcyclohexane, trans-1-p-fluorophenyl-4-n-heptylcyclohexane, trans-1-p-n-propylphenyl-4-n-pentylcyclohexane, trans-1-p-n-methoxyphenyl-4-n-propylcyclohexane, p-[trans-4-(trans-4-ethylcyclohexyl)-cyclohexyl]-trifluoromethoxybenzene, p-[trans-4-(trans-4-propylcyclohexyl)-cyclohexyl]-trifluoromethoxybenzene, p-[trans-4-(trans-4-n-butylcyclohexyl)-cyclohexyl]-trifluoromethoxybenzene, p-[trans- 4-(trans-4-n-pentylcyclohexyl)-cyclohexyl]-trifluoromethoxybenzene, p-[trans-4-(trans-n-propylcyclohexyl)-cyclohexyl]-2-(3,4-difluorophenyl)-ethane, p-[trans-4-(trans-n-pentylcyclohexyl)-cyclohexyl]-2-(3,4-difluorophenyl)-ethane, p-[trans-4-(trans-n-propylcyclohexyl)-cyclohexyl]-2-(4-trifluoromethoxyphenyl)-ethane, p-[trans-4-(trans-n-pentylcyclohexyl)-cyclohexyl]-2-(4-trifluoromethoxyphenyl)-ethane, 4'-(trans-4-n-propylcyclohexyl)-3,4-difluorobiphenyl, 4'-(trans-4-n-pentylcyclohexyl)-3,4-difluorobiphenyl, 4,4'-bis-(trans-4-propylcyclohexyl)-2-fluorobiphenyl, 4,4'-bis-(trans-4-pentylcyclohexyl)-2-fluorobiphenyl and 4-(trans-4-pentylcyclohexyl)-4'-(trans-4-propylcyclohexyl)-2-fluorophenyl.

5. A composition of claim 1 consisting essentially of trans-1-p-fluorophenyl-4-n-pentylcyclohexane, trans-1-p-fluorophenyl-4-n-hexylcyclohexane, trans-1-p-fluorophenyl-4-n-heptylcyclohexane, trans-1-p-n-propylphenyl-4-n-pentylcyclohexane, trans-1-p-n-methoxyphenyl-4-n-propylcyclohexane, p-[trans-4-(trans-4-ethylcyclohexyl)-cyclohexyl]-trifluoromethoxybenzene, p-[trans-4-(trans-4-propylcyclohexyl)-cyclohexyl]-trifluoromethoxybenzene, p-[trans-4-(trans-4-n-butylcyclohexyl)-cyclohexyl]-trifluoromethoxybenzene, p-[trans-4-(trans-4-n-pentylcyclohexyl)-cyclohexyl]-trifluoromethoxybenzene, p-[trans-4-(trans-4-n-propylcyclohexyl)-cyclohexyl]-2-(3,4-difluorophenyl)-ethane, p-[trans-4-(trans-4-n-pentylcyclohexyl)-cyclohexyl]-2-(3,4-difluorophenyl)-ethane, p-[trans-4-(trans-4-n-propylcyclohexyl)-cyclohexyl]-2-(4-trifluoromethoxyphenyl)-ethane, p-[trans-4-(trans-4-n-pentylcyclohexyl)-cyclohexyl]-2-(4-trifluoromethoxyphenyl)-ethane, 4'-(trans-4-n-propylcyclohexyl)-3,4-difluorobiphenyl, 4'-(trans-4-n-pentylcyclohexyl)-3,4-difluorobiphenyl, p-[trans-4-(trans-4-n-propylcyclohexyl)-cyclohexyl]- 2-(p-fluorophenyl)-ethane, p-[trans-4-(trans-4-n-pentylcyclohexyl)-cyclohexyl]-2-(p-fluorophenyl)-ethane, 4,4'-bis-(trans-4-propylcyclohexyl)-2-fluorobiphenyl, 4,4'-bis-(trans-4-pentylcyclohexyl)-2-fluorobiphenyl, and 4-(trans-4-pentylcyclohexyl)-4'-(trans-4-propylcyclohexyl)-2-fluorophenyl.

6. A composition of claim 1 consisting essentially of trans-1-p-fluorophenyl-4-n-pentylcyclohexane, trans-1-p-fluorophenyl-4-n-hexylcyclohexane, trans-1-p-fluorophenyl-4-n-heptylcyclohexane, trans-1-p-n-propylphenyl-4-n-pentylcyclohexane, trans-1-p-n-methoxyphenyl-4-n-propylcyclohexane, p-[trans-4-(trans-4-ethylcyclohexyl)-cyclohexyl]-trifluoromethoxybenzene, p-[trans-4-(trans-4-propylcyclohexyl)-cyclohexyl]-trifluoromethoxybenzene, p-[trans-4-(trans-4-n-butylcyclohexyl)-cyclohexyl]trifluoromethoxybenzene, p-[trans-4-(trans-4-n-pentylcyclohexyl)-cyclohexyl]-trifluoromethoxybenzene, p-[trans-4-(trans-4-n-propylcyclohexyl)-cyclohexyl]-2-(3,4-difluorophenyl)-ethane, p-[trans-4-(trans-4-n-pentylcyclohexyl)-cyclohexyl]-2-(3,4-difluorophenyl)-ethane, p-[trans-4-(trans-4-n-propylcyclohexyl)-cyclohexyl]-2-(4-trifluoromethoxyphenyl)-ethane, p-[trans-4-(trans-4-n-pentylcyclohexyl)-cyclohexyl]-2-(4-trifluoromethoxyphenyl)-ethane, 4'-(trans-4-n-propylcyclohexyl)-3,4-difluorobiphenyl, 4'-(trans-4-n-pentylcyclohexyl)-3,4-difluorobiphenyl, p-[trans-4-(trans-4-n-propylcyclohexyl)-cyclohexyl]-2-(p-fluorophenyl)-ethane, p-[trans-4-(trans-4-n-pentylcyclohexyl)-cyclohexyl]-2-(p-fluorophenyl)-ethane, 4,4'-bis-(trans-4-propylcyclohexyl)-2-fluorobiphenyl, 4,4'-bis-(trans-4-pentylcyclohexyl)-2-fluorobiphenyl, and 4-(trans-4-pentylcyclohexyl)-4'-(trans-4-propylcyclohexyl)-2-fluorophenyl.

7. In a liquid-crystal active matrix display device comprising a liquid-crystal composition, the improvement wherein the composition is one of claim 1.

8. A composition of claim 1, which does not exhibit any crystallization at −30° C.

* * * * *

UNITED STATES PATENT AND TRADEMARK OFFICE
CERTIFICATE OF CORRECTION

PATENT NO. : 5,279,763
DATED : January 18, 1994
INVENTOR(S) : Kei SASAKI et al.

It is certified that error appears in the above-indentified patent and that said Letters Patent is hereby corrected as shown below:

Under EXAMPLE 1:
Column 4, line 68: Change "fluorophenyl" to read
- - fluorobiphenyl - -.

Under EXAMPLE 2:
Column 5, line 47: Change "fluorophenyl" to read
- - fluorobiphenyl - -.

Under EXAMPLE 3:
Column 6, line 24: Change "fluorophenyl" to read
- - fluorobiphenyl - -.

Claim 4; column 8, line 19: Change "fluorophenyl"
to read - - fluorobiphenyl - -.
Claim 5; column 8, line 47: Change "fluorophenyl"
to read - - fluorobiphenyl - -.
Claim 6; column 9, line 6: Change "fluorophenyl"
to read - - fluorobiphenyl - -.

Signed and Sealed this

Twenty-fifth Day of February, 1997

BRUCE LEHMAN

Attest:

*Attesting Officer*

*Commissioner of Patents and Trademarks*